US009430924B2

(12) United States Patent
Frederick

(10) Patent No.: US 9,430,924 B2
(45) Date of Patent: Aug. 30, 2016

(54) AC-COUPLED RFID SYSTEM

(75) Inventor: Thomas Frederick, Chapel Hill, NC (US)

(73) Assignee: Clairvoyant Technology LLC, Chapel Hill, NC (US)

( * ) Notice: Subject to any disclaimer, the term of this patent is extended or adjusted under 35 U.S.C. 154(b) by 29 days.

(21) Appl. No.: 14/400,439

(22) PCT Filed: May 18, 2012

(86) PCT No.: PCT/US2012/038587
§ 371 (c)(1),
(2), (4) Date: Nov. 11, 2014

(87) PCT Pub. No.: WO2013/172850
PCT Pub. Date: Nov. 21, 2013

(65) Prior Publication Data
US 2015/0130594 A1    May 14, 2015

(51) Int. Cl.
*G08B 13/24* (2006.01)
*G06K 7/10* (2006.01)
*H04B 5/00* (2006.01)

(52) U.S. Cl.
CPC ....... *G08B 13/2488* (2013.01); *G06K 7/10009* (2013.01); *G06K 7/10019* (2013.01); *G08B 13/248* (2013.01); *H04B 5/0062* (2013.01)

(58) Field of Classification Search
CPC ............. G06K 7/008; G06K 7/10019; G06K 19/0723; G06K 7/10029; G06K 7/10356; G06K 7/10039; G06K 7/10059
USPC ........................................ 340/10.2
See application file for complete search history.

(56) References Cited

U.S. PATENT DOCUMENTS

| 7,953,370 | B2 * | 5/2011 | Ninomiya | G06K 19/07 340/10.2 |
| 8,952,788 | B1 * | 2/2015 | Dacus | G06K 7/10039 340/10.1 |
| 2007/0096881 | A1 * | 5/2007 | Pillai | G06K 7/0008 340/10.51 |
| 2007/0206704 | A1 * | 9/2007 | Zhou | G06K 7/0008 375/316 |
| 2008/0063102 | A1 * | 3/2008 | Okunev | H04L 27/3836 375/261 |
| 2009/0045917 | A1 * | 2/2009 | Volpi | G01S 13/878 340/10.1 |
| 2010/0099355 | A1 | 4/2010 | Rofougaran et al. | |

OTHER PUBLICATIONS

Clairvoyant Technology LLC, International Application No. PCT/US2012/038587, International Search Report, Aug. 8, 2012.
The International Bureau of WIPO, International Application No. PCT/US2012/036587, International Preliminary Report on Patentability dated Nov. 27, 2014, 7 pages.
European Patent Office; Extended European Search Report for European Application No. 12877050.0 dated Feb. 23, 2016.

* cited by examiner

*Primary Examiner* — Mark Blouin
(74) *Attorney, Agent, or Firm* — Steven B. Phillips; Moore & Van Allen PLLC

(57) ABSTRACT

An AC-coupled RFID system is disclosed. Embodiments of the invention statistically correlate the transmit data from a baseband transmit signal and the receive data in a receive signal after the signal has passed through a baseband receive filter. By using a receive bandpass or high-pass filter at baseband, the receiver can be AC-coupled in the baseband. This AC coupling significantly reduces cost and complexity by eliminating high-power reflected signals at and near DC. The high-pass corner frequency of the receive filter passes enough of the receive signal to still be measurable. The correlation is used to estimate the reflected carrier, which in turn enables cancellation of the carrier, improving RFID reader sensitivity.

26 Claims, 10 Drawing Sheets

AC-COUPLED RFID SYSTEM

BACKGROUND ART

Retail stores have long made use of "electronic article surveillance" or EAS, which is used to detect shoplifters. EAS systems commonly in use today employ magnetic or electromagnetic fields to detect tags placed on items in the stores. There has been a recent movement toward using radio frequency identification (RFID) for retail EAS. When an item is paid for the tag on that item is deactivated or removed at the point of sale. The EAS system at the exit detects the presence of active tags as they leave the store, indicating the presence of an item which has not been purchased and is being stolen. When the EAS system detects a tag, an alarm is activated for the retailer's loss prevention team. The RFID tags can, advantageously also be used for tracking and inventory management in the "back room" of the retail establishment, in distribution centers, and even in the manufacturing environment. RFID tags have found many other applications as well, for example, tracking vehicles, tracking pets, and as entry credentials for secured environments.

In passive RFID systems the reader must transmit a radio frequency (RF) carrier signal so that tags can communicate to the reader by modulating their signals onto the reader's RF carrier. Tags modulate their signals onto the reader's RF carrier via inductive or capacitive coupling in the near field or via backscatter modulation in the far field. For some applications the reader must estimate the amount of RF carrier transmission which is being reflected into its own receiver in order to cancel the carrier. For example, most high performance readers use active carrier reflection cancelling to reduce the transmit power reflected into the reader's receiver. These active transmit reflection cancellers must use a sensor or other mechanism for determination of the reflected transmit power in order to adapt the active cancellation circuitry.

DISCLOSURE OF EMBODIMENTS OF THE INVENTION

An AC-coupled RFID system is disclosed. Embodiments of the invention statistically correlate the transmit data from a baseband transmit signal and the receive data in a receive signal after the signal has passed through a baseband receive filter. By using a receive bandpass or high-pass filter at baseband the receiver can be AC-coupled in the baseband. This AC coupling significantly reduces cost and complexity by eliminating high-power reflected signals at and near DC that would otherwise require a sensor or other more complex circuitry to estimate carrier power being reflected into the receiver. The high-pass corner frequency of the receive filter passes enough of the reflected signal to still be measurable, and explicit training signals are not needed. The correlation is used to estimate the reflected carrier, which in turn enables cancellation of the carrier, improving RFID reader sensitivity.

A system for reading RFID tags according to at least some embodiments of the invention includes a transmit path to produce a transmit signal and a receive path to demodulate a receive signal produced in response to the tag signal resulting from the transmit signal. A carrier estimator connected to the receive path and the transmit path estimates an amplitude of the reflected signal. The amplitude estimate can then be used to cancel the reflected carrier in the receive signal. A baseband receive filter can be used to AC-couple the receive signal in the receive path so that the carrier estimator determines the amplitude based on the transmit signal and a filtered receive signal. More effective carrier cancellation gives the system a lower noise floor, enabling it to read RFID tags with greater accuracy and at greater distances.

In some embodiments, the carrier estimator is also operable to determine a phase of the reflected signal. In some embodiments, a programmable digital signal processor implements the carrier estimator and reads the tags. In some embodiments, the DSP is also used to implement an RF metal detector. In some embodiments, the carrier estimator determines a statistical central tendency from the filtered receive signal. In some embodiments, the carrier estimator is operable to determine the amplitude and phase of the reflected signal at least in part calculating a cross-correlation between a calibration signal as the transmit signal and the filtered receive signal resulting from the reflected calibration signal. It should be noted that the calibration signal can be a regular RFID command. No explicit training signal is needed.

In some embodiments, the carrier estimator includes a first multiplier connected to the receive path and a delay element disposed between the first multiplier and the transmit path. An integrator can be connected to the first multiplier, and a second multiplier can be connected to the integrator to multiply an output of the integrator by an inverse of the command length. In some embodiments, the baseband receive filter is a bandpass filter and in some embodiments, the baseband receive filter is a high-pass filter.

In some embodiments, the carrier estimator for the RFID system is operable to determine the amplitude of the reflected signal at least in part by applying a nonlinearity to the receive signal. In such embodiments, the carrier estimator may include a summer connected the nonlinearity, an integrator connected to the summer, and a multiplier connected to the integrator to multiply an output of the integrator by an inverse of a command length.

An RFID system according to embodiments of the invention can perform carrier cancellation to aid in processing RFID signals by sending a calibration signal and calculating the cross-correlation between the calibration signal and the resulting receive signal. The cross-correlation can then be searched for a magnitude peak. A transmit delay value is set in accordance with this magnitude peak. Thereafter, carrier estimates are produced at least in part by multiplying AC-coupled receive data by transmit data delayed by the transmit delay value, and these carrier estimates are used to cancel the carrier. Other techniques can be used to set the transmit delay value if there is a desire to avoid the calibration process. In some embodiments, producing the carrier estimate includes accumulating discrete integrator values from the result of the multiplication described above and normalizing the discrete integrator values with an inverse command length. The carrier estimate can include amplitude only or amplitude and phase. In some embodiments where phase is determined, the carrier estimate can also used for RF metal detection.

The carrier cancellation process, other aspects of the RFID process and other related processes can be implemented by means of processor together with appropriate transmitter and receiver hardware and an antenna or antennas. The processor can be exemplified by a digital signal processor or controller executing appropriate microcode, firmware or software stored in the RFID system. Alternatively, the processor can be hard-wired circuits or one or more custom integrated circuits, or a combination of any of these.

BEST MODES FOR CARRYING OUT THE INVENTION

Figure 1:
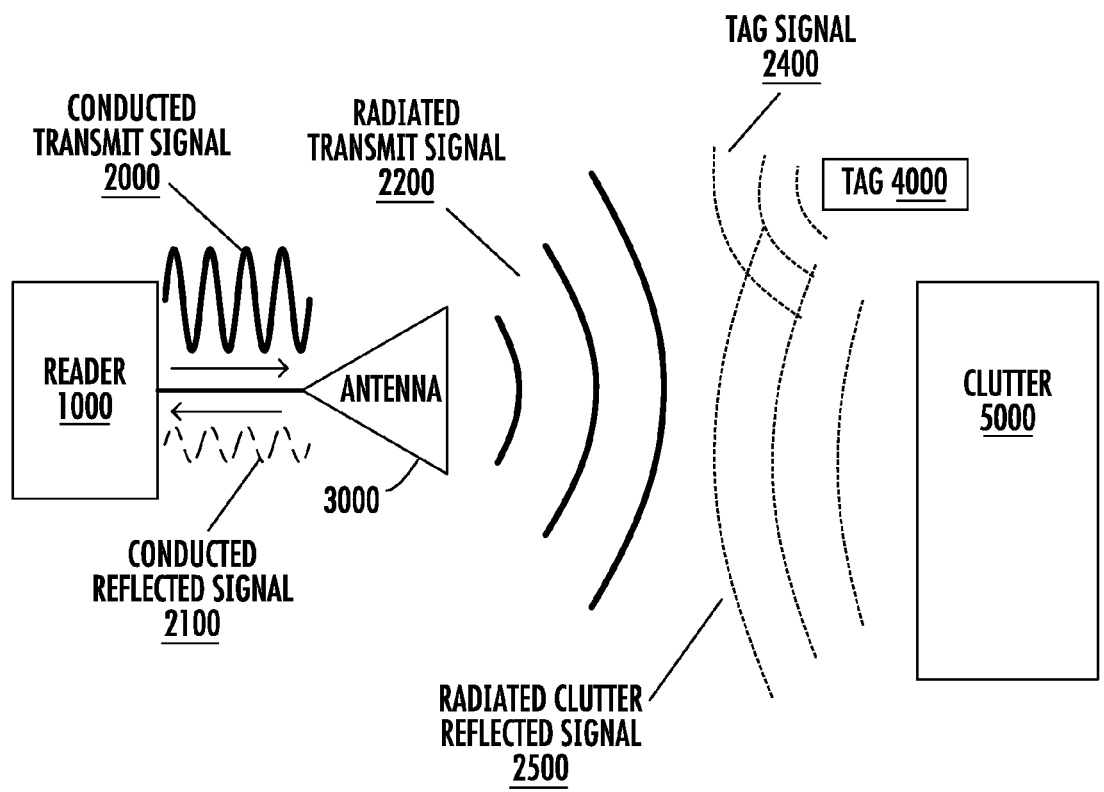
FIG. 1 is a block diagram of the operating environment for example embodiments of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Like numbers refer to like elements throughout.

Terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" or "comprising," when used in this specification, specify the presence of stated features, steps, operations, elements, or components, but do not preclude the presence or addition of one or more other features, steps, operations, elements, components, or groups thereof. Additionally, comparative, quantitative terms such as "above", "below", "less", "greater", are intended to encompass the concept of equality, thus, "less" can mean not only "less" in the strictest mathematical sense, but also, "less than or equal to."

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein. It will also be understood that when an element is referred to as being "connected" or "coupled" to another element, it can be directly connected or coupled to the other element or intervening elements may be present.

With respect to the signaling involved in implementing embodiments of the invention, the signal sent out by an RFID system to cause a response by an RFID tag is generally referred to as a transmit signal or a carrier signal, and this term can refer to the RF version or the baseband version of such a signal, either propagating through the air or being processed by the system as the context may indicate. The data that is used to modulate such a signal may be referred to as transmit data. Certain types of transmit signals may be designated by a more specific reference, for example, a calibration signal. Similarly, a tag signal and receive data may be used to refer to RFID signals and the data, respectively, coming to the reader from an RFID tag. A transmit signal or transmit data may also be referred to as a transmit command or more simply, a command, and a tag signal or data may also be referred to as a response. Any portion of the transmit signal coming back to an RFID system, whether from antenna reflections or from reflections off objects in the environment, may be referred to herein as a reflected signal, a reflected transmit signal, or a reflected carrier. The signal entering the receiver of the RFID reader will be termed the receive signal. The receive signal consists of the sum or composite of all noise, interference, any tag signals, and reflected transmit signals.

Some embodiments of the invention uses a cross-correlation operation between baseband transmit commands and receive signals gathered from the receiver after the received signals have passed through a baseband receive bandpass filter. By using a receive bandpass filter at baseband instead of a lowpass filter, the receiver can be AC-coupled in the receive baseband. This approach can significantly reduce cost and complexity of a system by eliminating the high power reflected signals at and near DC. The high-pass corner frequency of the receive bandpass filter passes enough of the reflected signal so that the reflected signal is still measurable. The bandpass-filtered reflection signal can be statistically correlated with the lowpass transmit signal, and this correlation is used to estimate the reflected carrier.

It should be noted that weakly DC coupled receive baseband filters can be designed and that the use of such a filter would still fall within the spirit and scope of the invention described herein. For example, instead of placing a frequency domain zero at DC, a circuit designer could place a zero near but not on DC, and then place a frequency domain pole near the low end of the tag response band. Such a design would substantially reduce the DC response but may not technically be AC coupled. However, the carrier estimator using AC frequencies of the receive and transmit signals to estimate the reflected carrier amplitude and/or phase still would still be employing an embodiment of the invention.

Some embodiments of the invention use a monotonic nonlinearity of the received signal to estimate the reflected carrier power (energy) without using a cross-correlation with the transmit signal. This reduced complexity approach does not give phase information for the reflected carrier; however, in some applications the phase information is not needed.

In alternative embodiments of the invention, the baseband receive bandpass filter response filters out substantially all of the reader transmit modulation. The reflected power is instead estimated by measuring the phase modulation noise and amplitude modulation noise of the reflected RF carrier using the alternative embodiment described in the paragraph above. Using this alternative embodiment there is no synchronization requirement with the transmitter, since the reflected phase and amplitude noise are always present in the receiver. This technique can be used during the tag receive periods or reader command periods since the reader command itself is not used in the carrier estimation.

FIG. 1 shows a top level diagram of an RFID operating environment. RFID reader 1000 sends a transmit RF signal 2000 conducting through some waveguide to an antenna 3000. The waveguide is typically a coaxial cable. With reference to the disclosed embodiments, the term "RF" may refer to the UHF band, such as 867 MHz or 915 MHz, or the microwave band, such as 2.4 GHz or 5.8 GHz. In general, the term "RF" refers to systems and methods which use electromagnetic energy at frequencies where far-field effects dominate in typical environments, as opposed to inductive or other systems, which are near-field based. Such frequencies, for example, may be those over 100 kHz, but would typically be at least 300 MHz or at least 500 MHz. Due to impedance mismatch between the coaxial cable and the antenna some portion of the conducted transmit signal is reflected back into the reader and is shown in FIG. 1 as the conducted reflection signal 2100.

In some embodiments the reader 1000 in FIG. 1 may use separate transmit and receive antennas, or multiple antennas, and various such antenna arrangements do not depart from either the spirit or scope of the invention. The transmit signal still couples into the receiver via paths within the reader circuitry. There may be coupling between transmit and receive antennas and reflections within the RFID environment. Despite such coupling and/or reflections, an embodiment of the invention disclosed herein may be used to estimate the carrier signal conducted into a receiver.

The radiated transmit signal 2200 in FIG. 1 is the portion of the transmit signal not reflected back into the reader from the antenna. This radiated transmit signal may be said to illuminate the interrogation zone so that any RFID tags within the interrogation zone are activated and respond to commands from the RFID reader 1000. FIG. 1 shows an RFID tag 4000 which will communicate back to the reader 1000 by backscatter modulation, producing a modulated tag signal 2400 which can propagate back toward the antenna 3000. Within the interrogation zone there are also generally other objects which produce reflections back toward the antenna. FIG. 1 shows an example object simply labeled "clutter" 5000, producing a clutter reflected signal 2500 which propagates back toward the antenna 3000.

Still referring to FIG. 1, the reflected signals 2400 and 2500 are converted by the antenna into electrical signals which are conducted back through the waveguide to the reader 1000. Of the signals being conducted into the reader, the transmit signal reflected from the antenna due to impedance mismatch is generally much higher power than the reflected signals 2400 and 2500. For example, if the reader's conducted transmit signal 2000 is 1 watt, or +30 dBm, and the return loss of the antenna is 15 dB, then the conducted reflected signal 2100 would be +15 dBm. However, reflected tag signals 2400 which are converted by the antenna 3000 into conducted electrical power typically result in signal levels from −35 dBm at the strongest to −75 dBm or even lower in some cases. Similarly, the clutter reflected signals 2500 typically result in conducted electrical power −10 dBm or lower. Therefore the reflected transmit signal 2100 due to the antenna impedance mismatch is typically at least two orders of magnitude more powerful than any of the radiated reflected signals.

Figure 2:
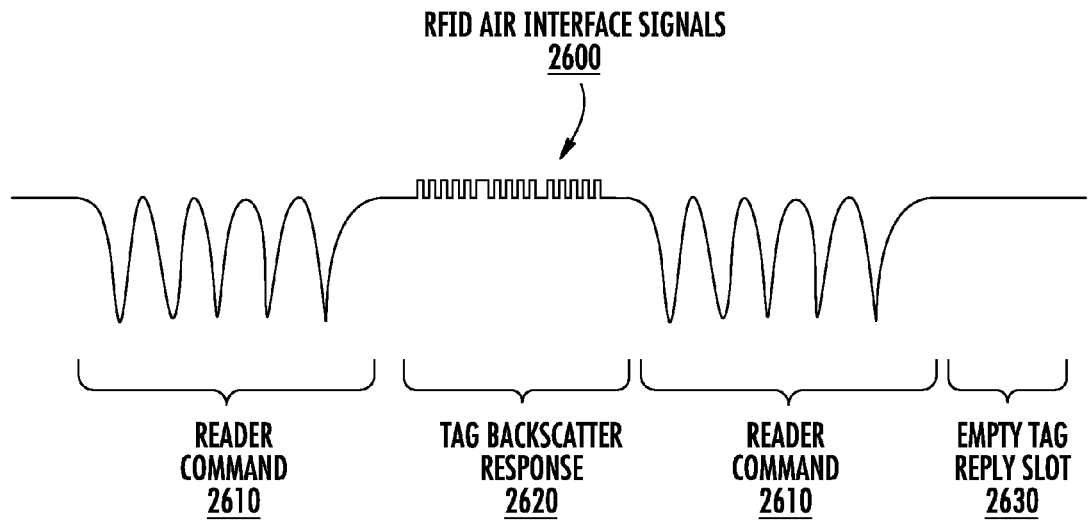
FIG. 2 is an illustration of an RFID air interface signal with which example embodiments of the invention can operate.

FIG. 2 is an illustration of typical RFID air interface communication signal 2600. Signal 2600 is described in part with reference to the components and signals shown in FIG. 1. The reader 1000 modulates its RF carrier with an encoded command to send a reader command 2610 to any RFID tags 4000 in the interrogation zone of FIG. 1. The modulation typically employed by the reader is large carrier or suppressed carrier amplitude modulation. In the commonly known ISO 18000-6C RFID protocol, hereafter referred to simply as "Gen2," the large carrier and suppressed carrier modulations are commonly referred to as DSB-ASK (double side-band amplitude shift keying) and PR-ASK (phase-reversed amplitude shift keying), respectively.

Still referring to FIG. 2, after the reader sends a first command 2610, one or more tags may reply using backscatter modulation and the tag response signal 2620 is shown in FIG. 2 as a modulation on the reader's RF carrier. This is typically followed by another reader command 2610. Sometimes depending on the tag states or if there are no tags in the interrogation zone there can be tag reply slots that are empty, as depicted by empty tag reply slot 2630 in FIG. 2.

Figure 3:
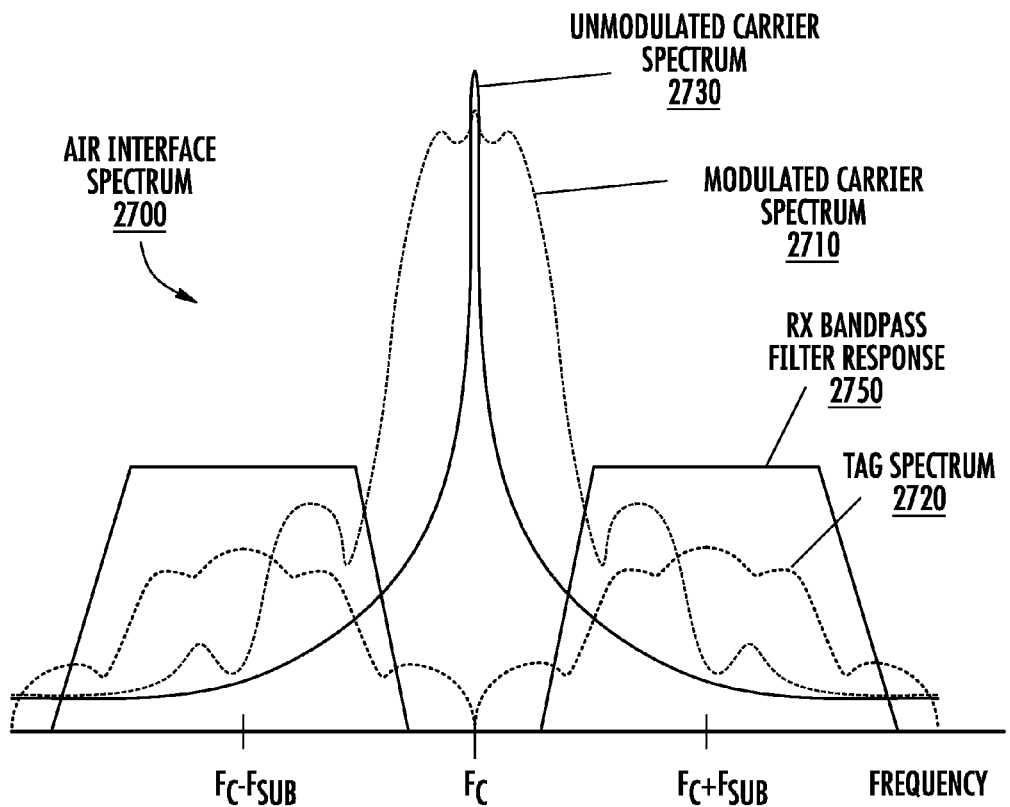
FIG. 3 is an illustration of the frequency spectrum for the RFID air interface signal shown in FIG. 2.

FIG. 3 shows an illustration of the signal spectrum 2700 for typical RFID air interface communications. The spectrum is centered at whatever RF carrier frequency $F_C$ to which the reader is programmed. During tag reply slots the reader sends unmodulated RF carrier which has a spectrum 2730 illustrated in FIG. 3. The RF carrier spectrum 2730 consists of a strong, very narrow main lobe of the oscillator, which has phase and amplitude noise "skirts" which slope away from the main lobe. The RF carrier oscillator phase and amplitude noise will be referred to as the carrier's PM and AM noise, respectively, in the remainder of the description. The phenomenon of oscillator PM and AM noise is well known to those skilled in the art of RF system design. The PM and AM noise due to the conducted reflection signal 2100 of FIG. 1 can be the dominant noise source in the reader's receiver.

Still referring to FIG. 3, the tag's backscatter communications are typically centered on a subcarrier frequency $F_{SUB}$ which is modulated onto the reader's RF carrier. The tag's backscatter spectrum 2720 is shown in FIG. 3. The reader's receiver can use a bandpass filter response 2750 that allows the tag's backscatter to essentially pass through, but filters out the majority of the RF carrier power reflected into the receiver. However, the AM and PM noise that passes through the bandpass filter response 2750 is usually still too high, and active TX-RX isolation hardware can be used to substantially reduce this carrier noise. The use of TX-RX isolation will be described in more detail with regard to FIG. 4. Note that the bandpass filter response 2750 is actually a baseband filter which is placed after the receive mixer that translates the RF signal down to baseband as will be discussed in FIG. 4. However, in FIG. 3 the bandpass filter response 2750 is translated up to RF for illustration purposes.

Finally, FIG. 3 also shows the modulated carrier spectrum 2710 which occurs when the reader is modulating a command onto the RF carrier as in the reader commands 2610 of FIG. 2. As is illustrated in FIG. 3, the main lobe of the modulated carrier spectrum 2710 is significantly widened as compared to the unmodulated carrier spectrum 2730, and some of the main lobe as well as some side lobes can fall into the receiver bandpass filter response 2750. The fact that some of the modulated carrier spectrum passes into the receiver bandpass response is generally not a problem since the receiver is not detecting tag responses during reader command modulation. Furthermore, embodiments of the invention disclosed herein describe how to use this signal energy of the command modulated RF carrier passing through the bandpass filter advantageously.

Figure 4:
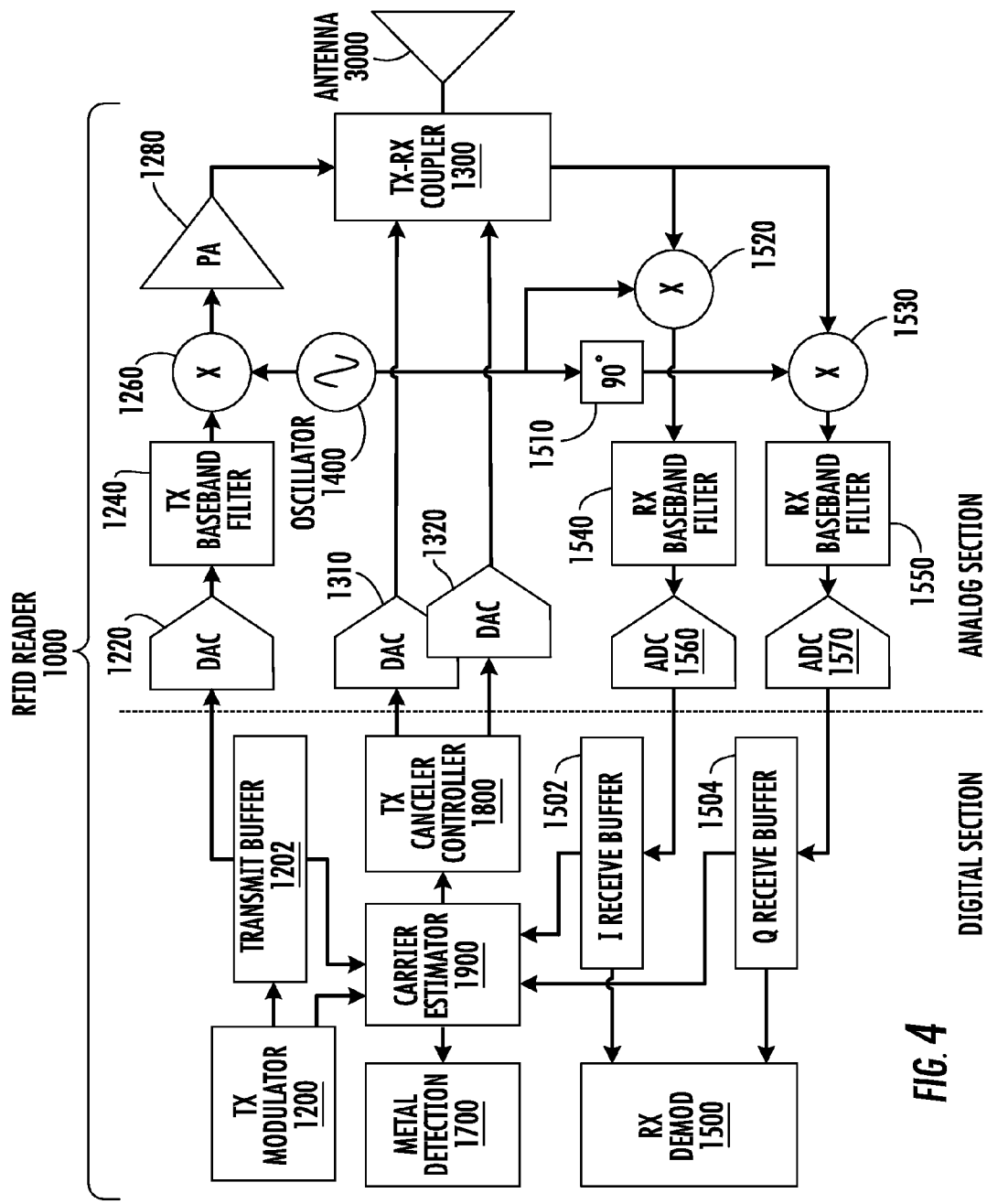
FIG. 4 is a block diagram of an example RFID reader according to embodiments of the present invention.

FIG. 4 shows a detailed block diagram of an RFID reader according to example embodiments of the invention. The reader 1000 consists of a transmit (TX) modulator 1200 which produces a discrete time sampled transmit waveform signal that is stored in a transmit buffer 1202. The contents of the transit buffer 1202 are sent to a transmit digital-to-analog converter (DAC) 1220, which produces a continuous time analog transmit waveform. The baseband analog transmit waveform is passed to the TX baseband filter 1240 which removes unwanted image frequencies produced in the digital-to-analog conversion process. The baseband analog transmit signal is passed to the transmit mixer or modulator 1260, which translates the signal to RF using an RF oscillator 1400. The transmit RF signal then is passed to a power amplifier 1280, whose output is passed into the transmit-receive (TX-RX) coupler 1300.

In the reader of FIG. 4, the TX-RX coupler 1300 could be a circulator, directional coupler, or any number of other apparatus to separate the forward propagating conducted transmit signal from the return propagating conducted receive signal. Because of the nature of backscatter RFID, the coupler 1300 frequently employs active carrier cancellation techniques. Coupler 1300 of FIG. 4 employs such techniques wherein the coupler is adapted by means of a pair of DACs 1310 and 1320. Such DACs can control an adaptive attenuator and an adaptive phase shifter, respectively, in order to produce a cancellation signal. Alternatively, the two DACs are used in a vector modulator to produce a cancellation signal. Still other techniques can be used, for example, a reflective modulator can be used wherein the two DACs control the reflection coefficient to cancel the antenna's reflection coefficient. In any of these cases, the DACs 1310 and 1320 are controlled by the TX canceller controller 1800. The controller 1800 must use a sensor or estimator for the amount of transmit signal reflecting into the receiver, as further discussed below.

Still referring to FIG. 4, the receiver input is passed from the coupler 1300 to quadrature mixers or demodulators 1520 and 1530 which also use the local RF oscillator 1400. The Q mixer 1530 takes its oscillator input from a 90° phase shifter 1510. Note that in some implementations the radio receive path may have low noise amplifiers, isolators, and/or RF bandpass filters such as SAW filters. The presence of these optional components does not cause an embodiment to deviate from the spirit or scope of the invention. The mixers 1520 and 1530 translate the RF signal to baseband so that the signal may be processed further. The mixer outputs are passed to baseband receive filters 1540 and 1550. These filters remove signals from different RF channels that are not of interest with regard to demodulating the RFID tag responses. The outputs of the baseband receive filters are passed to I and Q analog-to-digital converters (ADC) 1560 and 1570. The sampled, discrete time I and Q receive signals are passed into I and Q receive buffers 1502 and 1504 respectively. The I and Q receive buffers are inputs to the receive demodulator 1500. The receive demodulator 1500 decodes the tag responses.

The radio architecture described in FIG. 4 is a direct conversion type. This or other commonly known radio architectures could be employed without deviation from the spirit or scope of the invention claimed herein. It should be understood that the carrier estimation technique taught herein could be used with superhet or directly sampled RF radio architectures equally well. The transmit frequency translation could use polar modulation and/or an envelope tracking power amplifier without impacting the carrier estimation techniques. The exact configuration of the radio does not impact the ideas taught herein.

As mentioned in a previous paragraph, the TX canceller controller 1800 in the example of FIG. 4 uses a sensor or estimator for the amount of transmit signal reflected into the receiver. This estimation could be made using an RF power detector such as a diode detector or log detector. For example, this RF detector could be placed between the coupler 1300 and the mixers 1520 and 1530 in FIG. 4. However, the dynamic range of diode detectors is only tens of dBs, while log detectors can commonly operate with 40 dB of dynamic range. Since the reflected transmit power can range from +30 dBm when there is an antenna malfunction to −20 dBm or below with very good TX cancellation, the required dynamic range may be too large for even a good log detector. Another drawback of the log detector is that it provides only magnitude information. The controller 1800 may make use of phase information in the reflected carrier estimate in order to provide faster cancellation convergence. A final drawback of RF power detectors is that they require extra hardware, and therefore extra system complexity and cost. Beyond the diode or log detector itself, another ADC would be needed to sample the output of the detector.

An alternative technique that could be used to provide a reflected carrier estimate is to use the receive path itself. Since the same local oscillator 1400 is used for both the transmit and receive paths, the reflected carrier gets translated exactly to DC with only a phase shift due to the propagation path. If the RX baseband filters 1540 and 1550 are lowpass filters and the receive baseband is DC coupled, then the reflected carrier can be measured during unmodulated portions of the transmit signal. This technique presents difficulties for the receive baseband design however, since the dynamic range requirements for this technique are extremely large. As mentioned in the preceding paragraph, if the transmitter is producing +30 dBm output power and there is an antenna malfunction, the entire +30 dBm of signal can reflect back into the receiver. Even with a reasonable antenna return loss of 15 dB, the receiver gets +15 dBm of reflected carrier. The receiver must also be designed to detect and accurately demodulate tag signals at a level of −75 dBm or below. Such a wide dynamic range presents a significant design challenge, typically requiring significant circuit complexity and cost to perform well. In addition, the design of a direct coupled receiver baseband in and of itself has significant challenges because of DC offset problems in high gain receivers.

Yet another alternative technique that could be employed is to AC-couple the receiver baseband using bandpass filters for 1540 and 1550 instead of lowpass filters. Bandpass filters can eliminate the problems with nuisance DC offsets in high gain receivers, but does not allow direct measurement of the reflected carrier because that signal component is mixed down to DC and filtered out. To circumvent this problem one could apply a special training modulation to the transmitter which could be detected at the receiver and used to estimate the reflected carrier. The disadvantage of this approach is that it adds extra complexity in the digital portion of the transmitter and potentially in the digital portion of the receiver as well. Another problem with this approach is that the air time spent sending training signals is wasted with respect to reading tags. This technique represents pure overhead which reduces the throughput and efficiency of the air interface protocol. Finally, the biggest problem with this approach is that any modulated transmit signal sent with the sole purpose of measuring the reflected carrier broadcasts unnecessary interference into the RF environment. This extra modulated signal can interfere with tag reception by other readers in the vicinity.

The technique used with some embodiments of the invention illustrated by FIG. 4 is to use the reader command 2610 modulation itself as a means for AC-coupled carrier estimation. As seen if FIG. 3, the command modulated carrier spectrum 2710 has some spectral components that fall within the receive bandpass filter response 2750. Whether part of the main lobe of 2710, or side lobes of 2710 fall within the passband, the result will be statistical correlation between the samples in the receive ADC buffers 1502 and 1504 and the sampled transmit buffer 1202. This correlation can be calculated algorithmically and used as a good carrier estimate for the TX carrier cancellation controller 1800. The time varying carrier reflection estimate can also be used in RF metal detection algorithms 1700, as shown in FIG. 4, assuming both amplitude and phase are estimated, as further described below. This technique provides advantages including no air interface overhead, no added interference in the transmission due to extra training modulations, no extra dedicated hardware for reflection sensing, and greatly simplified baseband receiver design due to the AC coupling.

As mentioned above, a system like that of FIG. 4, if properly designed, can also serve as an RF metal detector. In the retail environment, some shoplifters construct shopping bags lined with layers of aluminum foil to block the magnetic or radio frequency (RF) fields from detecting RFID tags on shoplifted items as they exit the store. As a countermeasure to foil-lined bags, some retailers are placing metal detection systems at the entry/exit points of the store to detect the presence of the foil-lined bags. A conventional induction-based metal detector could be placed side-by-side with an RFID system. However, the digital signal processing capability of the system shown in FIG. 4 could be used for radio frequency metal detection, thereby eliminating the need for a conventional metal detector.

The metal detection algorithm for a system that combines an RF metal detector and an RFID system can operate as a state machine. In some embodiments, the metal detection process includes four main modes. A scan mode is the normal mode of operation when no moving objects have been sensed in or near the interrogation zone. The system is monitoring the power levels on the antennas, waiting for one or more power levels to satisfy a threshold indicating an object may be moving into the interrogation zone. A ready mode is entered when the power level on one or more antennas exceeds the threshold and the phase is decreasing while the power is increasing. An armed mode is entered when the power level on one or more antennas exceeds a second threshold. An alarm mode is entered when all antennas which had been armed pass an exit criterion. Once an alarm signal is sent the metal detection algorithm returns to the scan mode.

Since the Gen2 RFID protocol is a command-response communications system wherein the interrogator must transmit commands prior to each reply from the tags, the RFID reader's transmit period it very well suited to estimate reflected transmit signals in order to accomplish the metal detection function. Since the phase and power of the reflected transmit carrier signal can be measured in each command, anywhere from 100 microseconds to 3 milliseconds pass between measurements. These time periods are very well suited to estimate the reflected carrier signal as needed for metal detection. A detailed example of an RF metal detection technique that can be used with an RFID system as described herein can be found in PCT Patent Application WO/2012/027317, published Mar. 1, 2012, the entire disclosure of which is hereby incorporated herein by reference.

Figure 5:
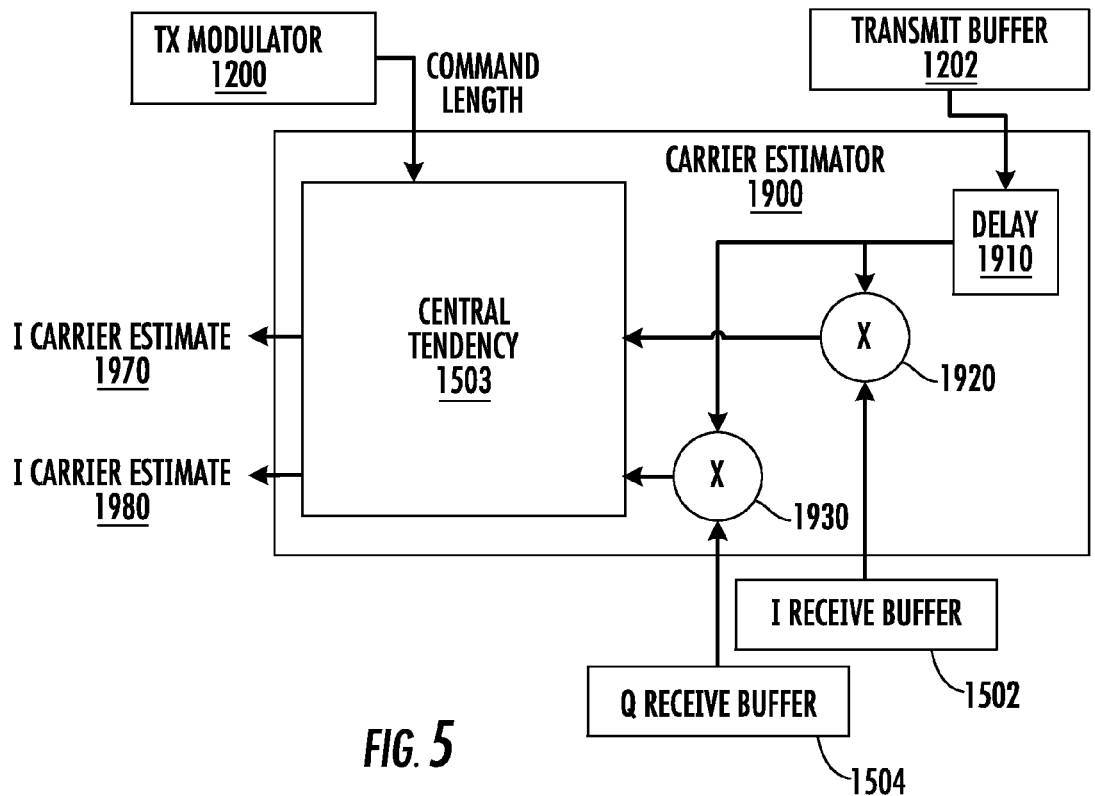
FIG. 5 is a block diagram illustrating a carrier estimator and its connections to the rest of the RFID system according to some example embodiments of the invention.

FIG. 5 shows a more detailed block diagram of an AC-coupled carrier estimator used with some embodiments of the invention. Carrier estimator 1900 uses a delay 1910 to match the digital internal delay from transmit to receive with the external delay through the analog front end of the system, which is primarily caused by delays through baseband analog and/or digital filters in the transmit and receive paths. The delayed transmit signal data is multiplied with the I and Q receive data in the receive buffers 1502 and 1504, using multipliers 1920 and 1930. The outputs of the multipliers are passed to processing logic 1503 to determine a central tendency of the receive signal as represented in the outputs of the multipliers. The final output from the central tendency process is the I and Q carrier estimate values 1970 and 1980, respectively.

Figure 6:
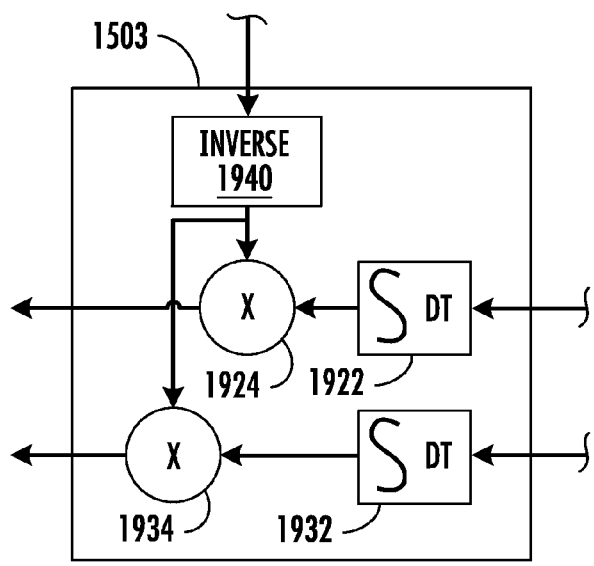
FIG. 6 is a block diagram illustrating one example way to determine central tendency within the carrier estimator of FIG. 5.

FIG. 6 illustrates an implementation example for the central tendency process. I and Q data in FIG. 6 is fed to discrete integrators 1922 and 1932. The integration period is over the duration of a reader command 2610 of FIG. 2. Since in common RFID protocols such as Gen2 the command lengths are varying, the variation must be taken into account to get an accurate carrier magnitude estimate. The command length is available from the TX modulator 1200. The command length goes through an inverse operation 1940, and then the inverse command length is multiplied by the discrete integrator outputs using multipliers 1924 and 1934, respectively, to normalize the discrete integrator outputs according to the command length.

Figure 7:
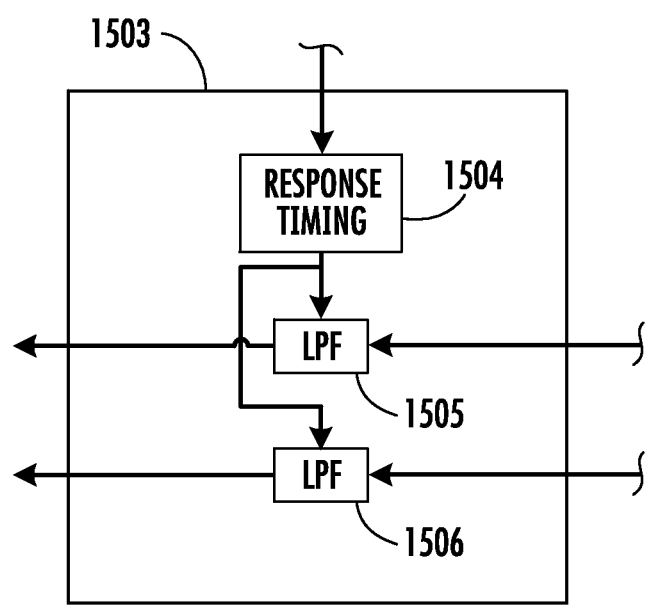
FIG. 7 is a block diagram illustrating another example of how to determine central tendency within the carrier estimator of FIG. 5.

FIG. 7 is another example of a way to determine central tendency in the carrier estimator of FIG. 5. In FIG. 7, a response timing block 1504 sets the response times of lowpass filters 1505 and 1506 so that the output of the lowpass filters settles by the end of a command. This arrangement mathematically averages the outputs of multipliers 1920 and 1930 of FIG. 5. With the embodiments of FIG. 5, any operation or operations which estimate central tendency of the outputs of multipliers 1920 and 1930 will work and does not depart from the scope or spirit of the invention. It should also be apparent to those of skill in the signal processing arts that the order of operations in the examples shown can often be reversed without affecting the outputs of the carrier estimator. For example, the order of discrete integration and command length multiplication can be reversed since scalar multiplication and discrete integration are linear operations.

Figures 8, 9:
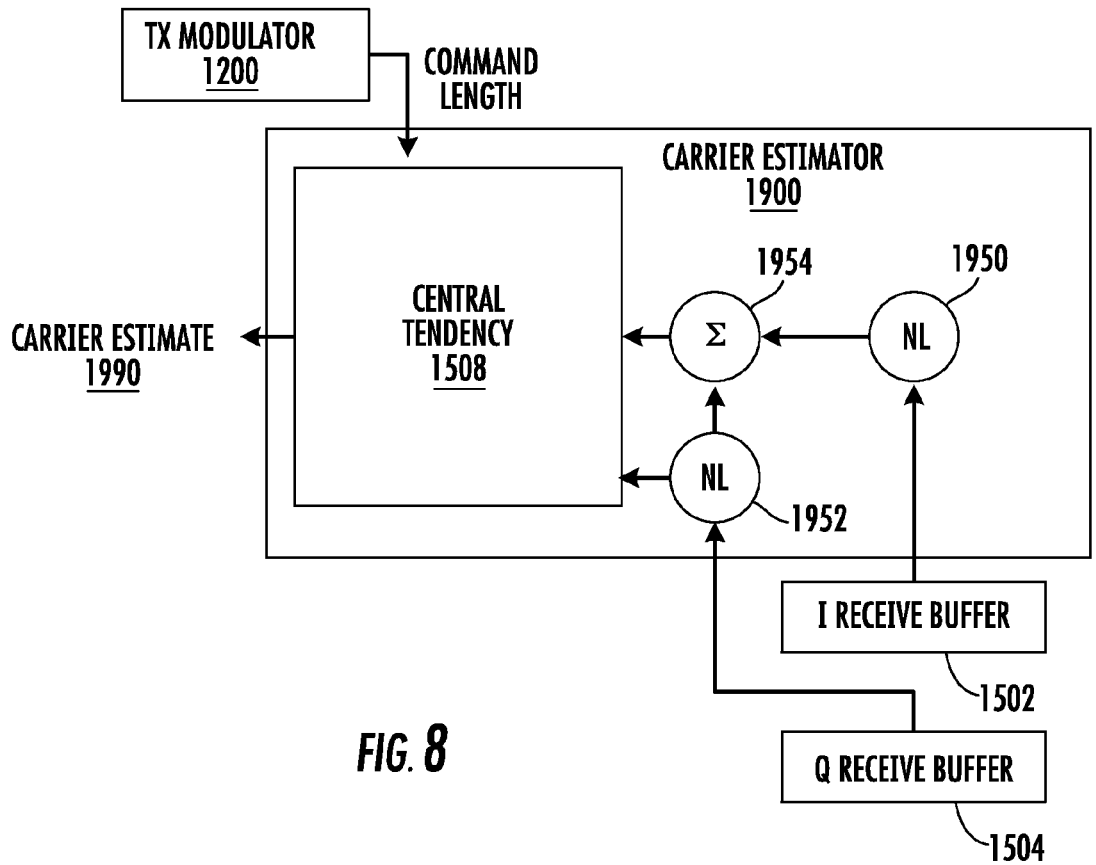
FIG. 8 is a block diagram illustrating a carrier estimator and its connections to the rest of the RFID system according to other example embodiments of the invention.
FIG. 9 is a block diagram illustrating one example way to determine central tendency within the carrier estimator of FIG. 8.

FIG. 8 shows and alternative embodiment for the carrier estimator, which is of reduced complexity for applications where the phase of the reflected carrier estimate is not needed. It should be noted that this carrier estimator cannot be used for the metal detection algorithm described above since the metal detection algorithm uses phase information.

However, the estimator of FIG. 8 could be used when the TX cancellation controller uses a closed loop update strategy which uses magnitude error only, such as with a downhill simplex algorithm. In FIG. 8, the I and Q receive data in the received buffers 1502 and 1504 is passed to nonlinearities 1950 and 1952. These nonlinearities could be absolute value, squaring, or any other type of nonlinearity which is a monotonically increasing function of the input signals magnitude. The outputs of the I and Q nonlinearities are summed by summer 1954 then passed to central tendency processing logic 1508. The output of the central tendency process is the carrier energy estimate 1990.

FIG. 9 illustrates an example implantation of the central tendency determination in FIG. 8. In FIG. 9, a discrete integrator 1956 accumulates the input over the period of the reader command. The output of the discrete integrator is normalized using the multiplier 1958 with the inverse command length. The output of the normalizing multiplier is the carrier energy estimate 1990. As discussed above, the order of the linear operations 1954, 1956, and 1958 in FIGS. 8 and 9 can be rearranged without affecting the final output 1990, since these are linear operations. For instance, the outputs of the nonlinearities 1950 and 1952 could each be scaled by the inverse command length, summed together, then integrated, or separately integrated, then summed.

Figure 10:
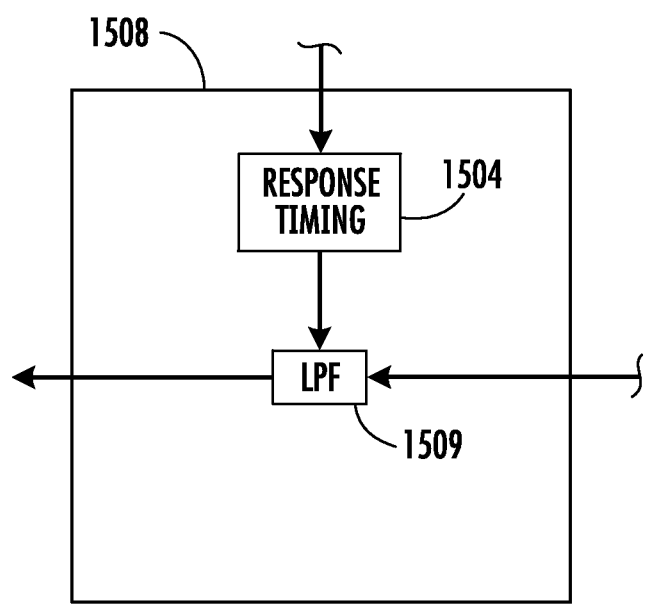
FIG. 10 is a block diagram illustrating another example of how to determine central tendency within the carrier estimator of FIG. 8.

FIG. 10 is another example of a way to determine central tendency in the carrier estimator of FIG. 8. In FIG. 10, response timing block 1504 sets the response time of lowpass filter 1509 so that the output of the lowpass filter settles by the end of a command. This arrangement mathematically averages the output of summer 1954 of FIG. 8. Furthermore, as discussed above, any operation which is a measure of central tendency can be used in place of the integration and inverse command length scaling. Other types of filters could be used in place of the lowpass filters shown in FIGS. 7 and 10, including a median filter, trimmed mean filter, or many other possibilities for estimating the center of the distribution of the nonlinearity output. The fundamental concept in these example embodiments of the carrier estimator is that the carrier energy estimate 1990 is an increasing function of the transmit signal reflection into the receiver even when the carrier signal itself has been removed by AC coupling.

In an alternative embodiment one might use a more complex delay equalization between data in the transmit buffer 1202 of FIG. 5 and data in the receive buffers 1502 and 1504. The group delay from the transmit buffer 1202 to the receive buffers 1502 and 1504 will generally be frequency dependent, and some amount of additional processing gain may be available by equalizing this frequency dependent delay, for example, with all-pass digital phase equalizers. This more complex approach does not add enough signal-to-noise improvement to be practical in all applications. However, it could be made to work for some applications and falls within the scope of the invention claimed herein.

Figure 11:
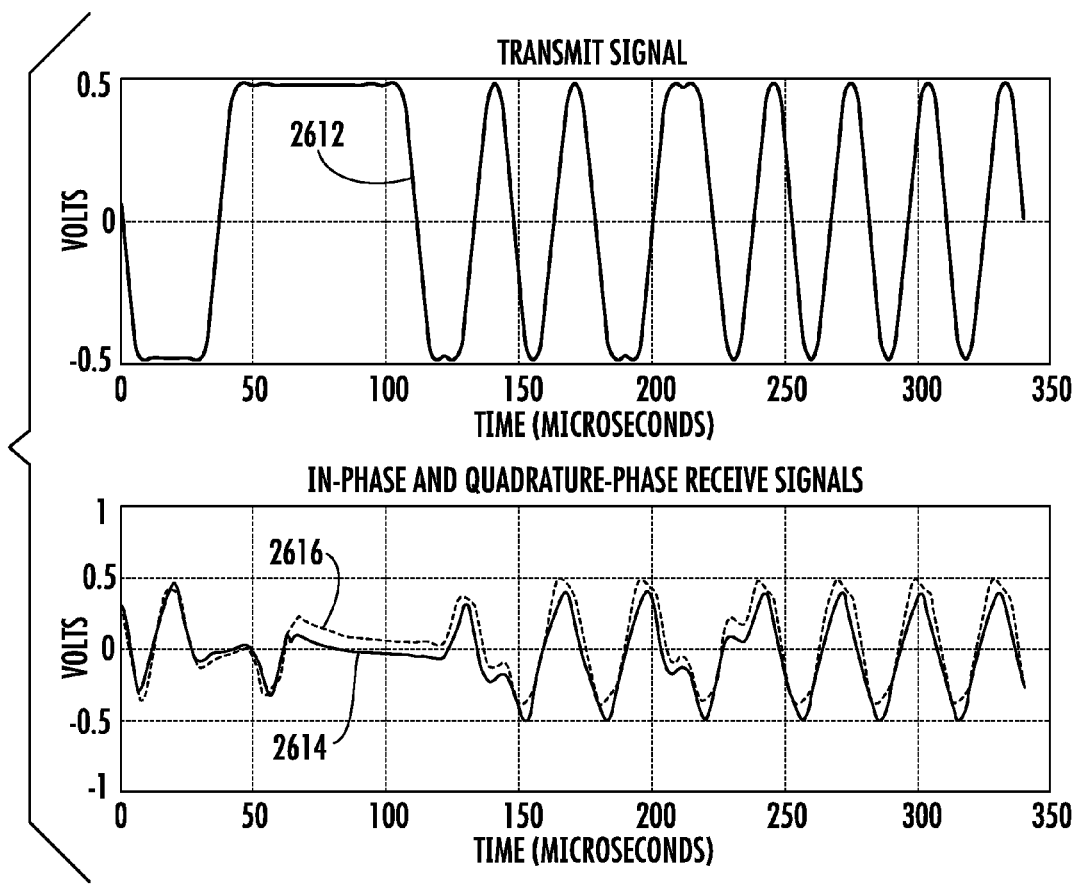
FIG. 11 illustrates example transmit and receive signals produced by example embodiments of the invention.

FIG. 11 shows examples of transmit and receive signals in the RFID reader. This data was taken from an RFID reader transmitting Gen2 protocol commands using a 12.5 microsecond tari symbol period. The top half of FIG. 11 shows the baseband transmit command 2612. The bottom part of FIG. 11 shows the I and Q receiver signals 2614 and 2616, respectively, sampled during the reader command. The I receive signal 2614 is shown with a solid line while the Q receive signal 2616 is shown with a dashed line.

Figure 12:
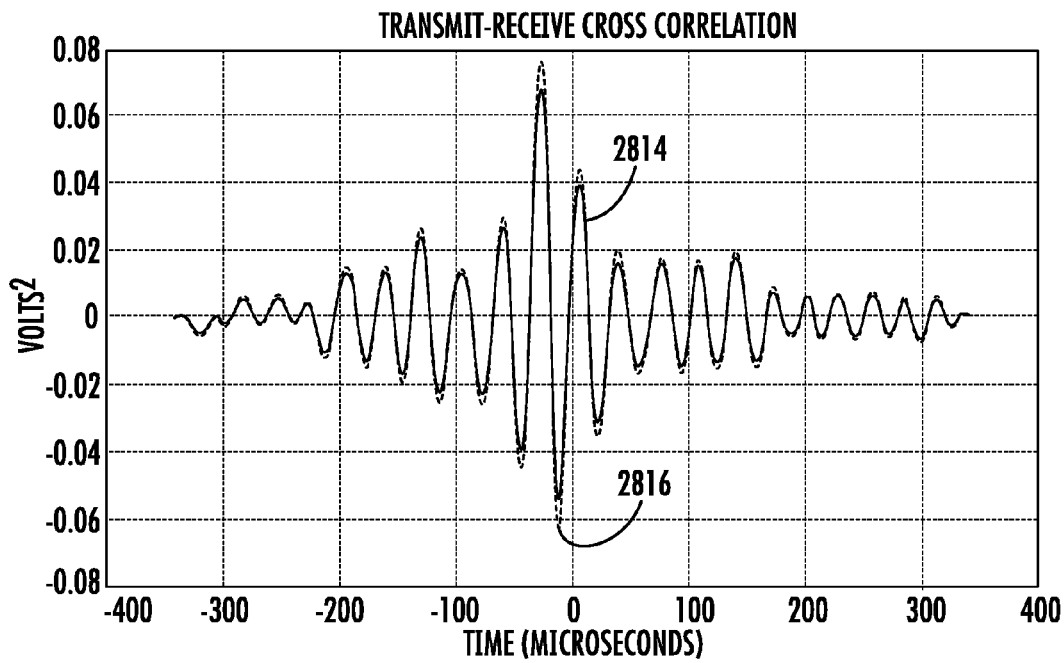
FIG. 12 illustrates the cross-correlation of transmit and receive signals according to example embodiments of the invention.

FIG. 12 shows the cross-correlation of the transmit and receive signals of FIG. 11. The cross-correlation of the transmit signal 2612 with the in phase I receive signal 2614 is shown as the solid line 2814, while the cross-correlation of the transmit signal 2612 with the quadrature phase Q receive signal 2616 is shown as the dashed line 2816. The delay can be seen to be about 30 microseconds.

Figure 13:
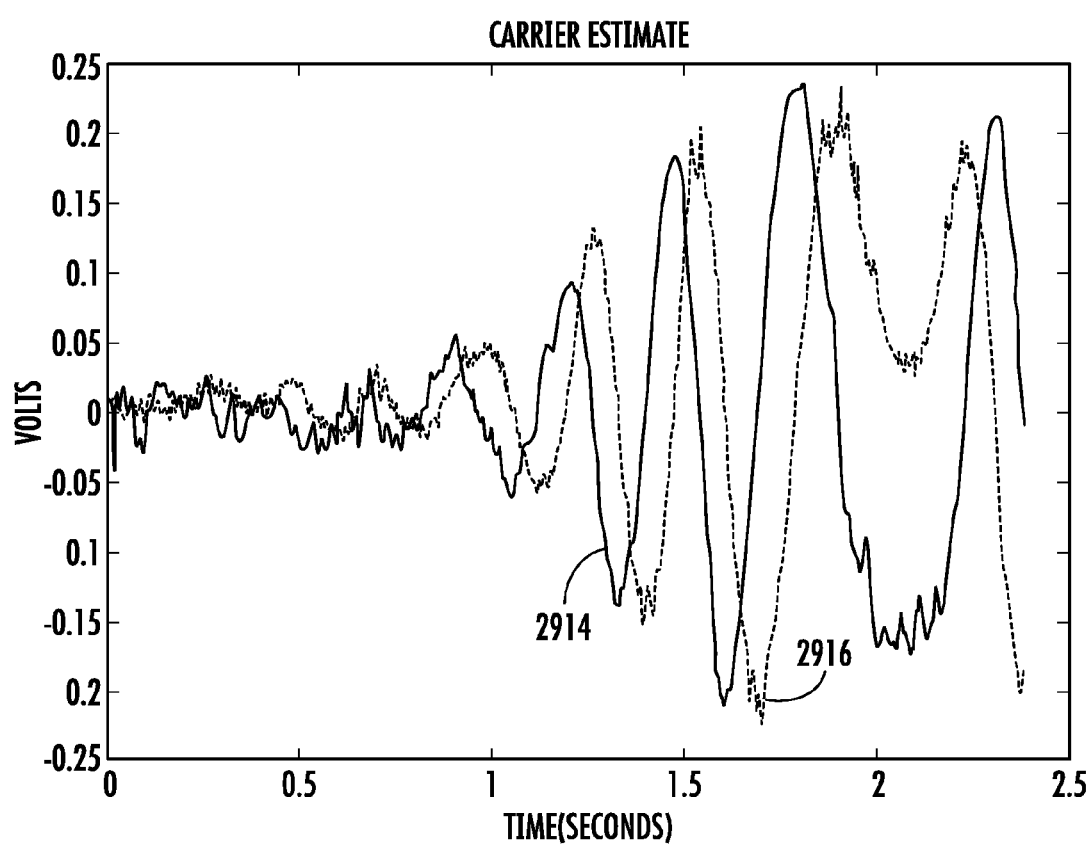
FIG. 13 is a diagram of the carrier I and Q estimation results obtained with some example embodiments of the invention.

FIG. 13 shows the carrier phase estimation results using an embodiment of the invention. The I and Q outputs of the carrier phase estimator, 2914 and 2916, respectively, are shown as a metal object comes in range at around 0.5 seconds and continues to approach the antenna until around 2.1 seconds. Starting at 2.1 seconds the object comes to a stop, then reverses direction and begins receding from the antenna.

Figure 14:
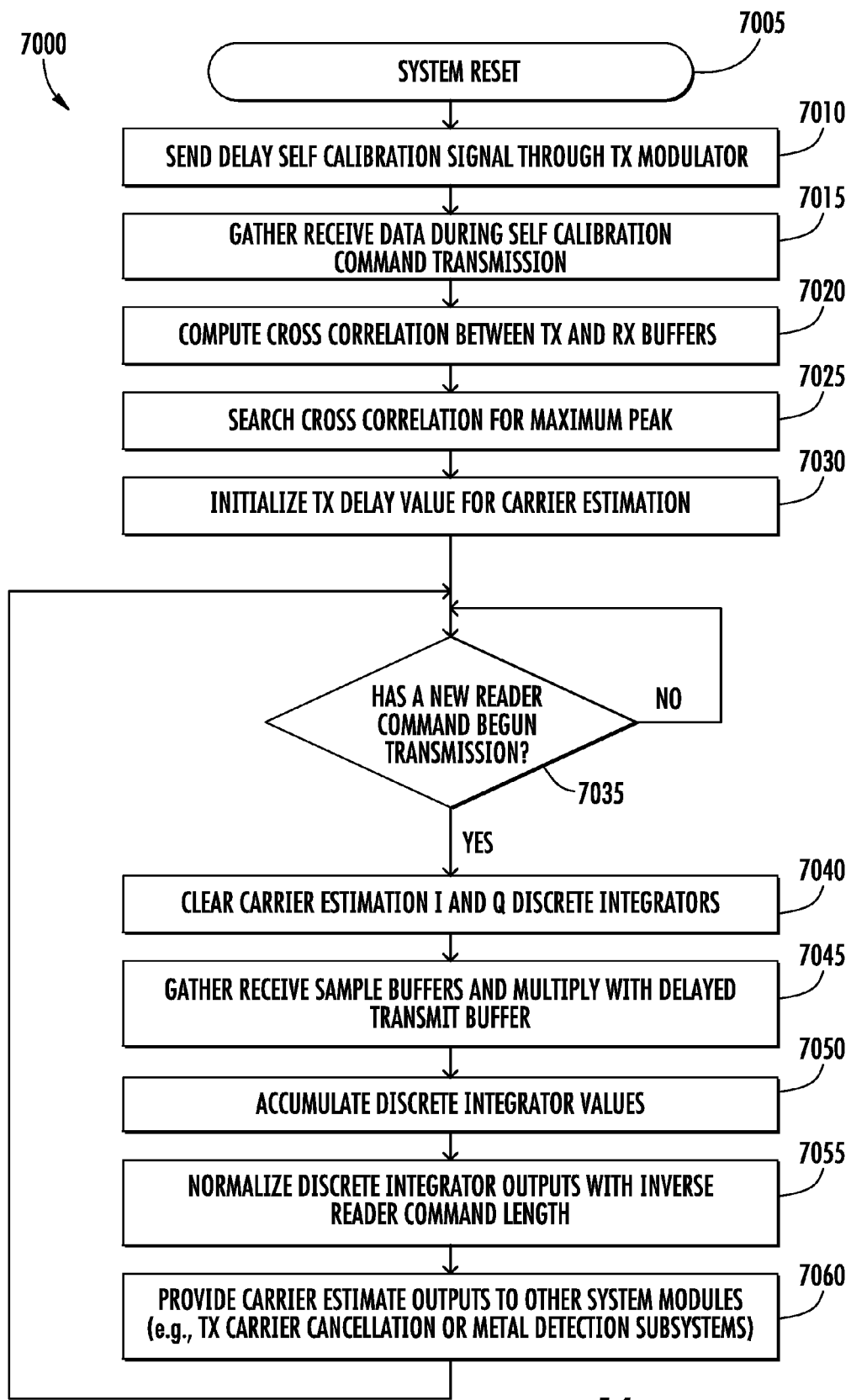
FIG. 14 is a flowchart illustrating the method of operation according to some example embodiments of the invention.

FIG. 14 shows a flowchart of a process 7000 for processing RFID signals using example embodiments of the AC-coupled system as described herein. Like most flowcharts, FIG. 14 illustrates the process as a series of subprocess blocks. At block 7005 the system goes through power on reset and boot up. At block 7010 the system sends a self calibration signal through the TX modulator. Blocks 7010 through 7030 provide a one time procedure to measure the TX delay needed to maximize correlation between the transmit signal and receive signal. At block 7015 the receive samples are gathered while the self calibration signal is transmitted. Note that the self calibration signal could be virtually any RFID reader command, such as a select command in the Gen2 protocol. At block 7020 the cross-correlation is calculated between the transmitted calibration signal and the receive signal produced by the reflection in response to the calibration signal and received by the reader. At block 7025 the cross-correlation is searched for the maximum magnitude peak. At block 7030 the TX delay value is initialized to the delay found to maximize the cross-correlation magnitude.

Still referring to FIG. 14, starting at block 7035 the system enters steady state operation. At block 7035 the carrier estimation subsystem waits for a new reader command transmission to begin. At block 7040 the accumulators for the I and Q discrete integrators are reset. At block 7045 the receive sample buffers are filled and read back. The receive data is multiplied with a delayed version of the transmit data from the transmit buffer. At block 7050 the discrete integrator values are accumulated from the multiplier outputs. At block 7055 the discrete integrator values from the integrator outputs are normalized with the inverse of the reader command length. At block 7060 the carrier estimate outputs are provided to other subsystems within the reader.

A processor used to implement an embodiment of the invention may be a general purpose digital signal processor, such as those commercially available from Texas Instruments, Inc., Analog Devices, Inc., or Freescale Semiconductor, Inc. It could as well be a field programmable gate array (FPGA) as are available from Xilinx, Inc., Altera Corporation, or other vendors. The processor could also be a fully custom gate array or application specific integrated circuit (ASIC). Any combination of such processing elements may also be referred to herein as a processor or DSP. One example embodiment uses a Blackfin® programmable DSP available from Analog Devices, Inc., capable of 500 MHz operation with integrated dual multiply/accumulate processors for up to $10^9$ multiply/accumulate operations per second.

In some embodiments, firmware, software, or microcode can be stored in a non-transitory form on or in a tangible medium that is associated with the processor. Such a medium may be a memory integrated into the processor, or may be a memory chip that is addressed by the processor to perform various functions. Such firmware, software or microcode is executable by the processor and when executed, causes the processor to perform its control and calculation functions. Such firmware or software could also be stored in or on a tangible medium such as an optical disk or traditional removable or fixed magnetic medium such as a disk drive used to load the firmware or software into an RFID system according to embodiments of the present invention.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A system for reading RFID tags, the system comprising:
   a transmit path to produce a transmit signal;
   a receive path to demodulate a tag signal produced in response to the transmit signal;
   a baseband receive filter to AC-couple a signal in the receive path to produce an AC-coupled receive signal; and
   a carrier estimator connected to the receive path and the transmit path to estimate at least one of an amplitude and a phase of a reflected carrier based on the transmit signal and the AC-coupled receive signal.

2. The system of claim 1 wherein the carrier estimator is further operable to determine both the amplitude and the phase of the reflected carrier.

3. The system of claim 2 further comprising an RF metal detector that at least in part uses the carrier estimator for metal detection.

4. The system of claim 1 wherein the carrier estimator is operable to determine the amplitude and/or the phase of the reflected carrier at least in part based on a cross-correlation of the transmit signal and the AC-coupled receive signal.

5. The system of claim 1 wherein the carrier estimator is operable to determine a central tendency in order to produce carrier estimate values.

6. The system of claim 5 wherein the carrier estimator further comprises:
   a first multiplier connected to the receive path;
   a delay element disposed between the first multiplier and the transmit path; and
   an integrator connected to the first multiplier;
   wherein the system is configured to normalize an output from the integrator.

7. The system of claim 1 wherein the baseband receive filter is a bandpass filter.

8. The system of claim 1 wherein the baseband receive filter is a high-pass filter.

9. The system of claim 7 wherein the carrier estimator is operable to determine a central tendency in order to produce carrier estimate values.

10. The system of claim 9 wherein the carrier estimator is operable to determine the amplitude of the reflected carrier at least in part by applying a nonlinearity to the receive signal.

11. The system of claim 10 wherein the carrier estimator further comprises:
    a summer connected the nonlinearity; and
    an integrator connected to the summer;
    wherein the system is configured to normalize an output from the integrator.

12. Apparatus for processing RFID signals, the apparatus comprising:
    means for estimating an amplitude of a reflected carrier to produce a carrier estimate;
    means for AC-coupling a receive signal so that the means for estimating can determine the amplitude based at least in part on a transmit signal and the receive signal; and
    means for cancelling the reflected carrier in the receive signal using the carrier estimate.

13. The apparatus of claim 12 further comprising means for determining a central tendency in order to produce carrier estimate values.

14. The apparatus of claim 13 further comprising means for estimating a phase of the reflected carrier.

15. The apparatus of claim 14 further comprising means for detecting metal based on the carrier estimate.

16. The apparatus of claim 14 further comprising:
    means for producing a calibration signal as the transmit signal;
    means for calculating a cross-correlation between the calibration signal and the receive signal;
    means for searching the cross-correlation for a magnitude peak;
    means for setting a transmit delay value according to the magnitude peak; and
    means for multiplying AC-coupled receive data by transmit data delayed by the transmit delay value.

17. The apparatus of claim 16 further comprising means for accumulating discrete integrator values from multiplied receive data and transmit data.

18. The apparatus of claim 17 further comprising means for normalizing the discrete integrator values.

19. The apparatus of claim 13 further comprising means for applying a nonlinearity to the receive signal.

20. A method of cancelling a carrier signal from a receive signal in an RFID system, the method comprising:
    AC-coupling the receive signal including a reflected carrier through a baseband receive filter to produce a filtered receive signal;
    estimating at least an amplitude for the reflected carrier using a transmit signal and the filtered receive signal to produce a carrier estimate; and
    using the carrier estimate to cancel the carrier signal.

21. The method of claim 20 wherein the estimating of at least the amplitude further comprises determining a central tendency in order to produce carrier estimate values.

22. The method of claim 21 wherein the estimating of at least the amplitude further comprises estimating a phase for the reflected carrier.

23. The method of claim 22 wherein the estimating further comprises multiplying AC-coupled receive data by transmit data delayed by a transmit delay value.

24. The method of claim 23 further comprising:
    calculating a cross-correlation using a calibration signal;
    searching the cross-correlation for a magnitude peak; and
    setting the transmit delay value in accordance with the magnitude peak.

25. The method of claim 24 further comprising:
    accumulating discrete integrator values from multiplied receive data and transmit data; and
    normalizing the discrete integrator values.

26. The method of claim 21 further comprising applying a nonlinearity to the receive signal.

\* \* \* \* \*